Dec. 16, 1924. 1,519,904
C. L. CUMMINGS
COMBINATION BONNET LOCK AND IGNITION CUT-OFF DEVICE FOR MOTOR VEHICLES
Filed Aug. 9, 1922
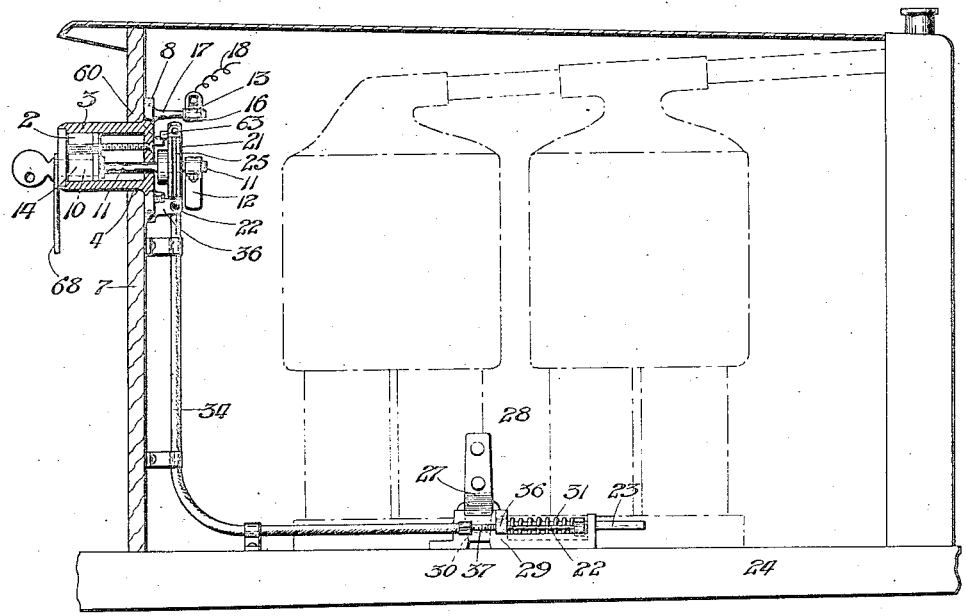
Fig. 1.
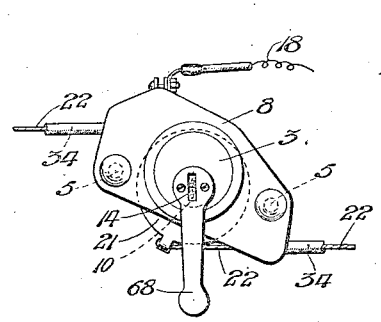
Fig. 2.
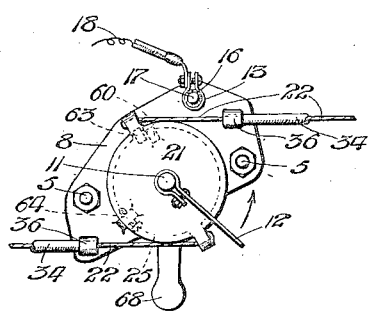
Fig. 3.
Fig. 4.
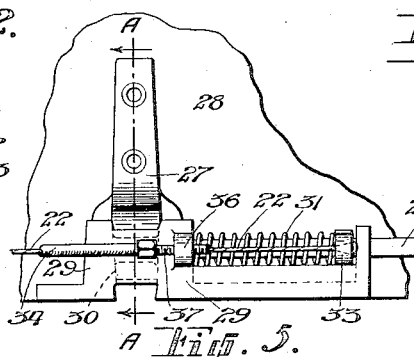
Fig. 5.
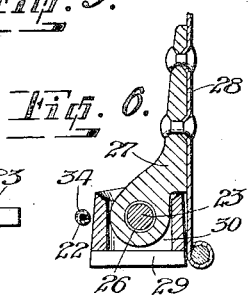
Fig. 6.
Fig. 7.
Fig. 8.
Inventor
C. L. Cummings
by
Att'y Patented Dec. 16, 1924.

1,519,904

UNITED STATES PATENT OFFICE.

CLIFFORD L. CUMMINGS, OF ST. KILDA, VICTORIA, AUSTRALIA.

COMBINATION BONNET LOCK AND IGNITION-CUT-OFF DEVICE FOR MOTOR VEHICLES.

Application filed August 9, 1922. Serial No. 580,798.

*To all whom it may concern:*

Be it known that I, CLIFFORD LANE CUMMINGS, a subject of the King of Great Britain and Ireland, and a resident of the city of St. Kilda, in the county of Bourke, State of Victoria, Commonwealth of Australia (whose post-office address is "St. Leonards" Church Square, in the said city of St. Kilda), have invented certain new and useful Improved Combination Bonnet Lock and Ignition-Cut-Off Devices for Motor Vehicles, of which the following is a specification.

This invention relates to a combination bonnet lock and cut off device for motor vehicles.

In my prior Australian Patent No. 17,635 of 1920 I have described an arrangement whereby the turning of a key in a lock situated in a convenient position such as on the dash or instrument board of an automobile, operates a crank and connecting rod mechanism, which in turn operates pivoted or rotary catches located on a cross shaft inside the bonnet to thereby lock the latter in closed position and simultaneously actuate a switch device to render the engine ignition system inoperative. By this means the car cannot be started by unauthorized persons and the engine parts within the bonnet are protected from theft.

The object of the present invention is to provide a modified and simplified mechanism for carrying out the above operation the new construction being cheaper to manufacture and apply and more readily adaptable to certain makes of automobiles.

Referring to the drawings which form part of this specification:—

Figure 1 is a part sectional side elevation showing the invention applied to a motor vehicle.

Figure 2 is a rear view of the key actuated lock, lock housing and other adjacent parts seen in Figure 1.

Figure 3 is a front view of the parts seen in Figure 2.

Figure 4 is a front view showing a modification of the arrangement seen in Figure 3.

Figure 5 is a side elevation of a spring controlled sliding catch and co-operating catch receiver on the side of the engine bonnet or hood.

Figure 6 is a cross section on line A—A Figure 5.

Figure 7 is a plan of the sliding catch seen in Figure 5.

Figure 8 shows an alternative arrangement of the spring controlled sliding catch.

According to the invention a key actuated lock 2 of the ordinary rotary cylinder or barrel type is disposed within a suitable housing 3 which passes through an opening 4 on the dash board 6 or instrument board 7 of the vehicle. The lock housing 3 is carried on a fixing plate or bracket 8 secured by bolts or screws 5 to the front side of the dash or instrument board.

Operatively connected to the rotary cylinder or barrel 10 of the lock and projecting forwardly through the front end of said housing 3 is a rotary operating rod or spindle 11 which carries, within the bonnet, a rotary circuit breaker or switch device preferably in the form of a spring contact arm 12 adapted to engage and disengage an adjacent stationary contact 13 as the key 14 of the lock 2 is turned in one direction or the other.

The stationary contact member may be insulated as at 16 from its supporting pillar 17 and connected to the ground wire 18 of the magneto or ignition system so that, on engagement of the contact arm 12 with the contact 13 the ignition apparatus is grounded through the machine frame and the spark plugs are rendered inoperative. It will be obvious, however, that the circuit breaking device may be otherwise suitably arranged to cut out the ignition system when the key 14 is turned to unlock the engine bonnet or hood as hereinafter described.

According to one form of the invention said operating rod or spindle 11 carries a rotary member 21 in the form of a disc or arms outstanding from the spindle. Attached to said rotary member are the rear ends of catch operating wires or like flexible connections 22 which may bed in peripheral grooves 25 of the rotary member 21. The forward ends of said flexible connections are attached to spring controlled sliding catches or bolts 23. These bolts are disposed longitudinally on opposite sides of the vehicle chassis or frame 24 and are adapted to pass into holes 26 in catch receivers or sockets 27 on the interior of the bonnet sides 28 whereby the bonnet or hood is locked in closed position and cannot be raised except by manipulation of the key 14.

The sliding bolts 23 are mounted in suitable guides 29 attached to the chassis 24 of the vehicle and provided with pockets 30 to accommodate the catch receivers 27. The controlling springs 31 of the bolts may be arranged to normally force the sliding bolts into either locked or unlocked position as desired. In the former case (as illustrated in Figure 8) the action of turning the key 14 to exert tension on the operating wires by movement of the rotary member 21 to which they are attached, results in the bolts or catches being withdrawn to unlock the bonnet, which is normally locked by the pressure of the springs 31 against collars 32 on the bolts. In the latter case (as illustrated in Figures 1, 5 and 7) the forward ends of the wires 22 are attached to arms 33 fixed to the bolts and the pull or tension exerted on the wires by the turning of the key, thus draws the bolts into engagement with the keepers or sockets 27 on the bonnet to lock the latter closed. This latter embodiment of the bolt and spring catch is preferred for the reason that under normal conditions the operating wires are relieved of strain which is only exerted when the vehicle is left unattended with the bonnet locked.

The turning of the key in a reverse direction obviously relaxes the tension on the wires or flexible connections 22 and thus locks or unlocks the bonnet as the case may be. In both cases the locking of the bonnet occurs synchronously with the grounding or cutting out of the ignition system as aforesaid.

The catch operating wires or connections 22 may pass around pulleys or the like or through a flexible or other suitable tubular casing 34 whereby the wires are guided and are adapted to move freely when the key is turned. The opposite ends of the tubular casings 34 may engage restraining lugs 36 on the bracket 8 and bolt guides 29 respectively. Length adjusting means 37 may also be provided in said tubular casings as shown in Figures 5 and 7.

As seen in Figure 4 the limit stop 64 may project from the front end of the cylindrical lock housing 3, which in this case passes through a central hole 67 in the fixing plate or bracket 8. In this example the turning of the operating rod in the direction of the arrow in Figure 4 to thus engage the contacts 12 and 13 and ground the ignition apparatus simultaneously relaxes the tension on the flexible connections 22 and thereby shoots the spring controlled bolt or catch 23 into locking position as in Figure 8. In Figure 3 the turning of the operating rod in the same direction draws the bolts into locking position against the action of the springs seen in Figures 5 and 7.

If desired a hand lever 68 may be secured to the rotary cylinder or barrel 10 of the lock 3 as in Figures 1 and 2 so that when the key 14 is inserted in the lock to release the cylinder 10 the latter may be turned by the lever 68 instead of by the key. The key is thus relieved of strain and a greater purchase on the operating rod 11 may be obtained.

By the invention a simple inexpensive and effective mechanism for the purpose indicated is provided, the various parts being cheap in first cost, not liable to derangement and capable of easy application to automobiles of various makes.

Having now described my invention what I claim as new and desire to secure by Letters Patent is:—

1. The combination with locking means for the opposite sides of a vehicle, bonnet or hood, of a lock barrel mounted in the dash of the vehicle, key controlled locking means including a rotatable shaft mounted in said barrel, means on the operator's side of the dash for operating said shaft when the key controlled locking means has been released, a member fixed on said shaft on the engine side of the dash, independent connections leading from said member to the hood locking means to positively operate the latter in the rotation of the member to lock or unlock the hood, and means carried by the member for grounding the ignition circuit in a predetermined position of the member.

2. The combination with locking means for the opposite sides of a vehicle, bonnet or hood, of a lock barrel mounted in the dash of the vehicle, key controlled locking means including a rotatable shaft mounted in said barrel, means on the operator's side of the dash for operating said shaft when the key controlled locking means has been released, a member fixed on said shaft on the engine side of the dash, independent connections leading from said member to the hood locking means to positively operate the latter in the rotation of the member to lock or unlock the hood, and a spring contact arm carried by the shaft and movable with the member to engage and ground a contact included in the ignition circuit, whereby when the member is in a predetermined position of a hood lock operation the ignition circuit will be grounded.

In testimony whereof I affix my signature.

C. L. CUMMINGS.

Witness:
VICTOR J. KELSON.